Sept. 15, 1964     P. E. SMITH, JR     3,149,271
SERVO POSITIONAL CONTROL APPARATUS Filed April 3, 1962     2 Sheets-Sheet 1

INVENTOR.
PAUL E. SMITH, JR.
BY
ATTORNEYS

Sept. 15, 1964 P. E. SMITH, JR 3,149,271
SERVO POSITIONAL CONTROL APPARATUS
Filed April 3, 1962 2 Sheets-Sheet 2

INVENTOR.
PAUL E. SMITH, JR.
BY
Kenway, Jenney & Hildreth
ATTORNEYS

United States Patent Office 3,149,271
Patented Sept. 15, 1964

3,149,271
SERVO POSITIONAL CONTROL APPARATUS
Paul E. Smith, Jr., Littleton, Mass., assignor, by mesne assignments, to The New York Air Brake Company, New York, N.Y., a corporation of New Jersey
Filed Apr. 3, 1962, Ser. No. 184,730
13 Claims. (Cl. 318—28)

This invention relates generally to servo control apparatus and more particularly it is concerned with apparatus for remote positioning of physically movable elements and control of process variables.

As is well known to those skilled in the art to which the present invention appertains, some form of power modulating device is generally used to energize the control element e.g. the servomotor of a conventional servo system. Error signals produced when the system is unbalanced control the operation of the power modulating device, the error signals in turn, being derived as a difference function of command signals fed into the system, and signals fed back from the output control elements representing the position of the element or some other physical condition. Generally, some form of transducer which produces very little power is employed to generate the command signals and the feedback signals with the result that conventional servo systems require a stable, reasonably high gain, amplifier to amplify the error signals and this amplifier accounts for a substantial portion of the cost of the system.

To avoid this requirement, the present invention contemplates the use of variable ratio transformers in which the functions of a signal transducer and amplifier are merged. Briefly, in accordance with the present invention, the output voltage produced by one variable ratio transformer is balanced against that of another such transformer, and the difference voltage derived thereby is used to energize the control element directly. The output voltage of one of the variable ratio transformers is controlled by the servomotor, and that of the other transformer is determined by command signals representative of the input variable. By way of example, the command signals can take the form of a positional adjustment of the transformer at the input end of the system which adjustment can be produced manually or by automatic means. Similarly, the output voltage of the transformer at the other end of the system can be varied automatically by the provision of an appropriate gear train connecting the servomotor shaft and the movable element of the transformer.

One type of variable ratio transformer that is suitable for use according to the invention is an adjustable autotransformer. Transformers of this type are readily available commercially with typical power ratings of from 135 watts up to several kilowatts. On a wattage basis, their cost is substantially less than that of a suitable electron tube or transistor amplifier.

A feature of the control apparatus of the present invention is also the use of a non-linear resistance element which effectively increases and decreases the sensitivity of the motor response in accordance with the extent of unbalance of the system. When the unbalance is large, then the resistance of the element is large. Conversely, when the system is very nearly in balance, then the resistance of the element is much less. It has been found that an ordinary incandescent lamp can be used as a suitable non-linear resistance element. By means of this device, the motor voltage is maintained at a safe value at all times and the tendency of the system to hunt is minimized much as it is with a servo amplifier having a non-linear gain characteristic but at a fraction of the cost of such an amplifier.

A primary object of the present invention, therefore, is to provide a low-cost servo control system.

Another object is to provide a simple and reliable system of this character.

A more specific object is to adapt a variable ratio transformer to use as a power modulating means and as a signal transducer in a system of this character.

The novel features of the invention together with further objects and advantages will become apparent from the following detailed description and the drawing to which it refers. In the drawing.

Figure 1:
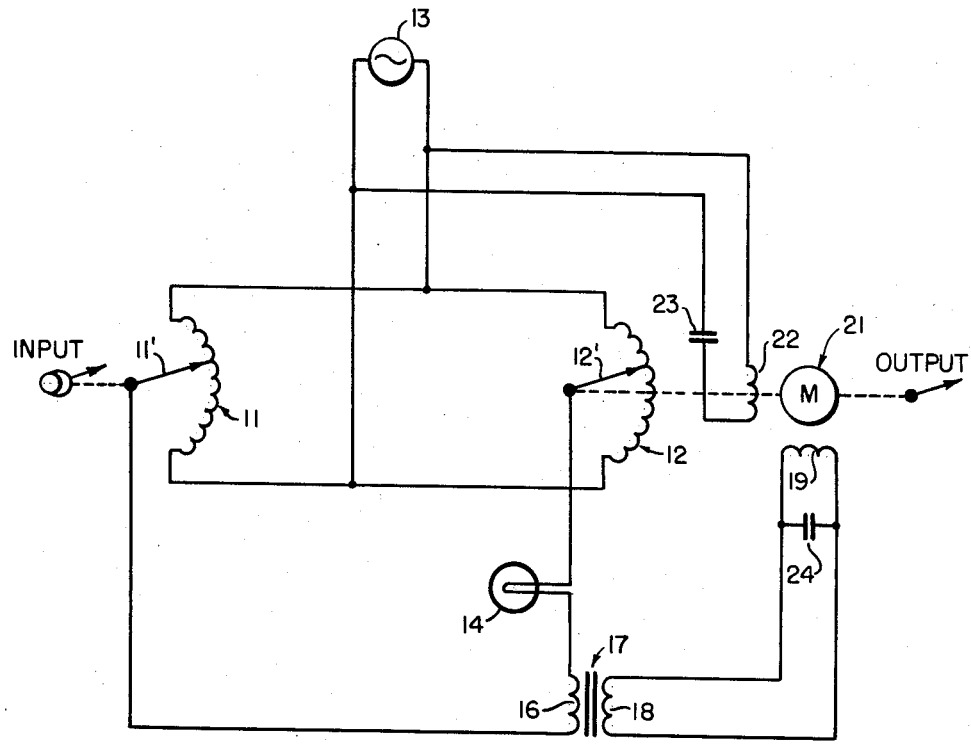
FIG. 1 is a schematic diagram of a basic form of the apparatus of the invention.

With reference first to FIG. 1 it will be observed that the numerals 11, 12 designate a pair of autotransformers and the numerals 11', 12' designate the movable elements for varying the turns ratios of the transformers. Each transformer is seen to have a single winding on a core which will ordinarily be comprised of a ferromagnetic material but which has not been shown in FIG. 1 for the sake of clarity. Connected to the input circuits of the transformers, that is between their winding ends, is an alternating current (A.C.) source 13. Connected to the output circuits of the transformers, that is between their movable elements, is a nonlinear resistance element 14 taking the form of an incandescent lamp in this specific embodiment and the primary winding 16 of a fixed ratio transformer 17. The secondary winding 18 of transformer 17 is connected to the control winding 19 of a conventional two phase servomotor 21 which has its reference winding 22 connected to A.C. source 13. A capacitor 23 is provided in series with the reference winding of the motor to shift the phase of the voltage applied thereto with respect to that applied to the control winding. Also there is a capacitor 24 in parallel with the control winding for tuning purposes, that is to make the load on the transformer 17 appear resistive and thereby effect a maximum power transfer to the motor. Finally, as indicated by the dotted line, the motor shaft is mechanically connected to the movable arm of the autotransformer 12 either directly or through a gear train of suitable ratio.

In operation the movable arm of the autotransformer 11 can be positionally controlled in any desired manner, automatically or manually. Let it be assumed for example that a manual positioning operation is to be accomplished with the system initially in balance. Thus by movement of element 11' in a clockwise direction to a selected position more remote from the upper winding end, the voltage developed across the output circuit of the autotransformer 11 will be reduced. In consequence a voltage unbalance or difference will be created as between the output voltages from autotransformers 11 and 12 and the resulting voltage difference appears across the series combination of lamp 14 and the primary of transformer 17. Transformer 17, in turn, energizes the control winding of the motor which moves the element 12' in a clockwise direction also. When this element 12' arrives at a position corresponding to that of movable element 11', then there will be no difference in the voltages at the output circuits of these transformers and the motor will stop turning for lack of a voltage on its control winding.

In the course of rebalancing the system, it is the function of the incandescent lamp 14 to provide a non-linear resistance which acts to limit the motor load current. That is, when the degree of unbalance is large, with the result that a relatively large voltage is present between the movable arms of the transformers, then the lamp exhibits a relatively high resistance which makes the current flowing in the circuit much less than would be otherwise. Conversely, when the error voltage is small, as is the case when the system is very nearly in balance, then the resistance of the lamp will not be nearly as large which in effect will make the motor much more sensitive to the error voltage. Under these conditions it is preferred that the impedance of the lamp be comparable to that of the load as it appears at the input or primary of the transformer. If necessary or desirable, another fixed ratio transformer can be employed to connect the lamp in circuit with the transformer primary 16 so that the effective impedance of the lamp will meet the foregoing criterion.

Another possibility is to locate the lamp in parallel with the primary or secondary winding of transformer 17 rather than in series. A disadvantage of this arrangement, however, is that a large circulating current will be caused to flow through the autotransformers by way of their movable elements or wipers so that it will not be possible to apply as large a motor load as it would be otherwise.

Figure 2:
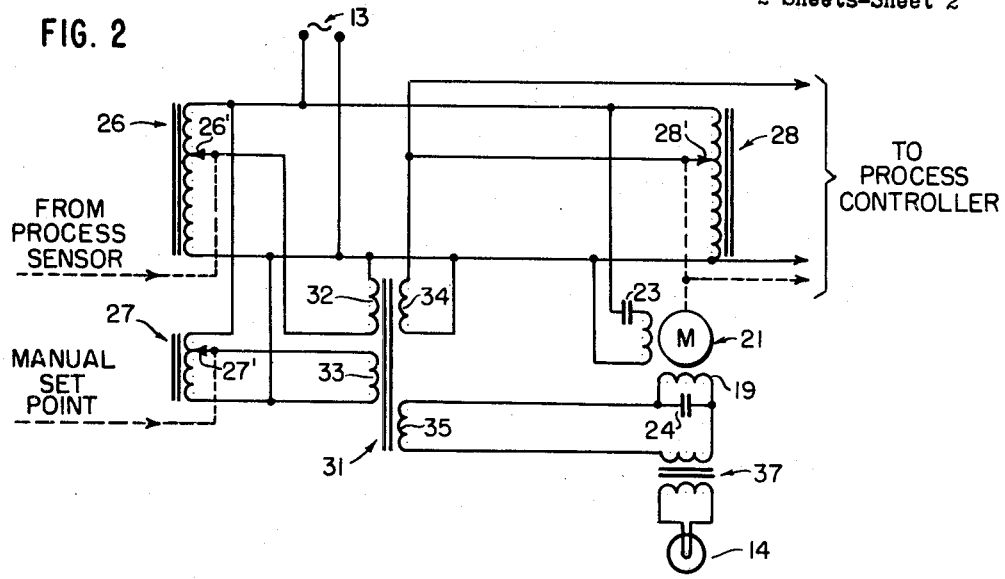
FIG. 2 is a schematic diagram of a modification of the apparatus for proportional control of a process variable.

Whereas the apparatus of FIG. 1 is applicable to the execution of remote positioning functions generally, the modified form of the apparatus illustrated in FIG. 2 is specifically adapted for the control of a process. In FIG. 2 it will be observed that there are three adjustable autotransformers 26, 27 and 28, and the inputs of these autotransformers are connected to a source of alternating current 13 as before. The movable element of auto transformer 27 is intended to serve as a means for making a manual adjustment in the process. It is contemplated that the movable element of autotransformer 26 be connected to some form of process sensing device such as a power driven chart recorder so that it will reflect variations in the characteristic of the process which it is desired to control. To control this variable characteristic of the process in response to a difference between the voltage established by manual adjustment of autotransformer 27 and the voltage proportional to the process variable as manifested by the position to which the movable element of autotransformer 26 is driven, either a mechanical or electrical output signal is available from adjustable autotransformer 28.

In addition to these autotransformers, there is provided in the embodiment of FIG. 2 a multi-winding fixed ratio transformer 31. The output circuit from autotransformer 26 is connected to a first winding 32 on this fixed transformer, the output circuit from autotransformer 27 is connected to another of its windings 33 and autotransformer 28 has its output circuit connected to still another winding 34. A fourth winding 35 on this transformer is coupled to the control winding 19 of the servo motor 21, the reference winding being connected to the alternating current source through the phase-shifting capacitor 23. As in FIG. 1, a capacitor 24 is provided in parallel with the control winding and an incandescent lamp 14 is coupled into the control winding circuit. A fixed ratio transformer 37 is provided to couple the lamp into the circuit as suggested in connection with the description of FIG. 1.

In describing the operation of this embodiment it will be assumed that a manual adjustment is made upsetting the null balance condition of the system which existed previously. Thus, a change in the setting of movable arm 27' of autotransformer 27 produces a change in the voltage applied to the fixed transformer winding 33. This upsets the flux balance which must have existed previously in the transformer 31 for the motor to have been at rest. In other words, as a result of the change in voltage upon the winding 33 there will be present in the transformer an amount of flux determined by the amount of the change which was introduced in the setting of the movable element and this flux induces a voltage in the winding 35 which energizes the motor. The motor in turn acts to produce movement of the element 28' of autotransformer 28 and, in this way, the voltage applied to winding 34 on the fixed transformer is likewise caused to change so as to compensate for the change in voltage on winding 33. When the voltage applied to winding 34 attains the proper value to reestablish a balance of flux in the transformer, the motor is disabled for lack of voltage on its control winding and the movable element of autotransformer 28 is brought to rest.

In response to the change in the position of the element 28' associated with autotransformer 28, it is contemplated that the agency for controlling the process variable will likewise undergo a change. For example, if the process variable to be controlled is light intensity, then the movable element 28' might be connected to a voltage control element such as a rheostat or the lamps or other light sources might be connected directly to the output circuit of autotransformer 28. In any case, when the process characteristic is caused to change, the change will be sensed by the sensor with which movable element 26' is associated and as a result, movable element 26' will be moved to a new position to reflect the change. Again a flux unbalance will be created in the core of the fixed transformer 31 so that the motor is energized and the movable element 28' associated with autotransformer 28 is moved to a new position adapted to rebalance the system. In this way, the agency for control of the process variable is continuously adjusted to establish the process variable at a value determined by the setting of autotransformer 27 and in the absence of other factors tending to change the value of the process variable, the system will ultimately assume a null balance condition with the desired value of the process variable having been realized. If extraneous factors are present tending to change the value of the process variable in a random or unpredictable manner, then of course the process control apparatus will continue in operation in order to make adjustments in the process as required to compensate for the effect of such factors.

Figure 3:
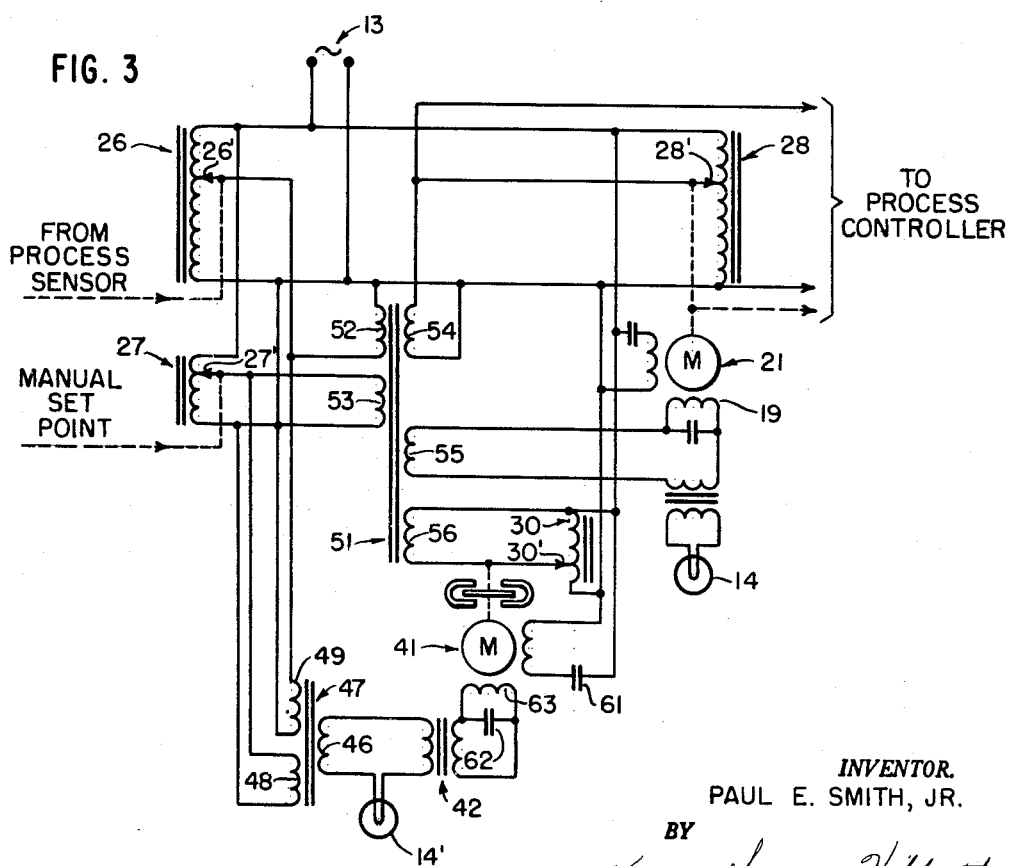
FIG. 3 is a schematic diagram of a refined version of the apparatus of FIG. 2.

In FIG. 3 there is illustrated a refined version of the apparatus of FIG. 2 in which an integrating type motor 41 has been incorporated. For example, motor 41 can be provided with an eddy current disk of the type used in conventional watt-hour meters. Coupled to the control winding of this motor by means of an impedance matching transformer 42 is a first winding 46 on a fixed ratio transformer 47. Transformer 47 has an additional pair of windings 48 and 49 which are connected to the respective output circuits associated with autotransformers 27, 26. Alternating current source 13 is connected to the input circuits associated with these autotransformers and to the input circuit associated with the process controlling autotransformer 28, as in FIG. 2.

Also, a multi-winding fixed ratio transformer 51 similar to that of FIG. 2 is provided except that transformer 51 has one additional winding 56 which is coupled to the output circuit of still another adjustable autotransformer 30. Autotransformer 30 has its movable element 30' connected to the integrating motor shaft. As before, the movable element 28' associated with the autotransformer 28 is operatively connected to the motor 21 and the control winding 19 of the motor 21 is energized by winding 55 of the fixed ratio transformer. Also it will be apparent that windings 52–55 correspond to windings 32–35 in FIG. 2 and are connected in like fashion. Suffice it to say, therefore, that the reference winding of the integrating motor 41 is connected to the alternating current source through a series phase shifting capacitor 61 while the control winding 63 of this motor is coupled to the winding 46 of transformer 47 through the impedance matching transformer 42 with a lamp 14' disposed in its primary circuit. Lamp 14' is similar to lamp 14 in circuit with the control winding of motor 21 and the tuning capacitor 62, like capacitor 24 of FIGS. 1 and 2, is provided across the secondary in parallel with the control winding itself.

In operation, those skilled in the art will recognize that the distinguishing feature of the apparatus of FIG. 3 is the introduction of another medium for control of the flux in the fixed ratio transformer as an integral function of the combined sensor and manual inputs reflected by the positions of the movable elements 26' and 27'. That is to say, if a difference exists between the desired value of the process variable manifested by the setting of movable element 27' and that which actually exists as manifested by the position of movable element 26', then a voltage will be induced in winding 46 to which the speed of the motor 41 is proportional. It follows that the voltage applied to winding 56 will likewise comprise the integral of this difference and in many applications this leads to a more accurate mode of control. For large errors, lamp 14' acts to limit the current in the control winding of the motor 41 in like manner as the lamp 14 does for the motor 21.

Although a 60 cycle source has been mentioned for use with the variable ratio transformers most commercial units operate satisfactorily over a wide range of frequencies including 400 cycles and 1000 cycles. Also it should be recognied that a single phase shaded pole type of motor can be used rather than a two-phase motor of the type described herein. For that matter it is possible to use a D.C. motor together with a phase sensitive demodulator. Various such modifications and alternatives within the spirit and scope of the invention will be apparent to those skilled in the art. Therefore, the invention should not be deemed to be limited to the details of what has been described herein by way of illustration but rather it should be deemed to be limited only by the scope of the appended claims.

What is claimed is:

1. Control apparatus comprising a first and second variable ratio transformer, each transformer having an input circuit and an output circuit, and a mechanical movable element, a servo motor operatively connected to the second movable element, an alternating voltage source coupled to the input circuits of said transformers, first circuit means coupled between the output circuit of said transformers for deriving a voltage which is a difference function of the voltages developed thereacross, said first circuit means including a non-linear impedance, the impedance of said non-linear impedance increasing with increases in said difference function voltage, and second circuit means coupled between the motor and said first circuit means for deriving from said difference voltage a control voltage for the motor.

2. Control apparatus comprising a first and a second adjustable autotransformer, each autotransformer having an input circuit, an output circuit, and a mechanically movable element, a servo motor operatively connected to the second movable element, said servo motor having a reference winding and a control winding, an alternating voltage source coupled to the input circuits of said autotransformers and to said reference winding, a transformer having primary and secondary windings, said primary being connected in series between the output circuits of said autotransformers, a non-linear impedance in series with said primary winding, each of said output circuits developing a voltage, whereby the voltage applied to said primary winding and non-linear impedance is a difference function of said output voltages, the impedance of said non-linear impedance increasig with increases in said difference function voltage, and said secondary winding being connected to the control winding of said motor to cause the motor to operate as a function of the difference of the voltages developed across said output circuits.

3. Control apparatus comprising a first and a second variable ratio transformer, each transformer having an input circuit, an output circuit, and a mechanically movable element, a servo motor operative connected to the second movable element, said servo motor having a reference winding and a control winding, an alternating voltage source coupled to the input circuits of said transformers and to said reference winding, a transformer having a primary winding and a secondary winding, an incandescent lamp, said primary winding and said incandescent lamp being connected in series between the output circuits of said autotransformers, and said secondary winding being connected to the control winding of said motor to cause the motor to operate as a function of the difference of the voltages developed across said output circuits.

4. Apparatus according to claim 3 including a first capacitor disposed in series with the reference winding of said motor to shift the phase of the voltage applied thereto, and a second capacitor disposed in parallel with the control winding of said motor to optimize the impedance characteristic of the load on said transformer produced by said motor.

5. Control apparatus comprising a first and a second variable ratio transformer, each variable transformer having an input circuit, an output circuit, and a mechanically movable element, a servo motor operatively connected to the second movable element, said servo motor having a reference winding and a control winding, an alternating voltage source coupled to the input circuits of said variable transformers and to the reference winding of said motor, a fixed ratio transformer, a first winding associated with said fixed transformer coupled to the output circuit of said first variable transformer, a second winding associated with said fixed transformer to the output circuit of said second variable transformer, a third winding associated with said fixed transformer coupled to the control winding of said motor, a fourth winding associated with said fixed transformer, and means to apply a manually adjustable voltage to said fourth winding.

6. Control apparatus comprising a first and a second variable ratio transformer, each variable transformer having an input circuit, an output circuit, and a mechanically movable element, a servo motor operatively connected to the second movable element, said servo motor having a reference winding and a control winding, an alternating voltage source coupled to the input circuits of said variable transformers and to the reference winding of said motor, a fixed ratio transformer, a first winding associated with said fixed transformer coupled to the output circuit of said first variable transformer, a second winding associated with said fixed transformer coupled to the output circuit of said second variable transformer, a third winding associated with said fixed transformer coupled to the control winding of said motor, a fourth winding associated with said fixed transformer, and an adjustable autotransformer to apply a manually adjustable voltage to said fourth winding.

7. Apparatus according to claim 6 including a non-linear impedance and transformer means to couple said non-linear impedance in circuit with the control winding of said motor.

8. Apparatus according to claim 7 including an incandescent lamp and transformer means to couple said lamp in circuit with the control winding of said motor.

9. Control apparatus comprising a first and a second variable ratio transformer, each variable transformer having an input circuit, an output circuit, and a mechanically movable element, a servo motor operatively connected to said movable element, said servo motor having a reference winding and a control winding, an alternating voltage source coupled to the input circuits of said variable transformers and to the reference winding of said motor, a first fixed ratio transformer having at least three windings, a first of said first fixed transformer windings being coupled to the output circuit of said first variable transformer, means to apply a manually adjustable voltage to a second of said first fixed transformer winding, a second fixed ratio transformer having at least five windings, a first of said second fixed transformer windings being coupled to the output circuit of said first variable transformer in common with the first winding of said first fixed transformer, a second of said second fixed transformer windings being coupled to said manually adjustable circuit means in common with the second winding of said first fixed transformer, a third of said second fixed transformer windings being coupled to the output circuit of said second variable transformer, a fourth of said second fixed transformer windings being coupled to the control winding of said motor, and means to apply a voltage to the fifth of said second fixed transformer windings which is an integral function of the voltage developed across the third of said first fixed transformer windings.

10. Apparatus according to claim 9 wherein said last-named means includes an integrating motor having a reference winding coupled to said alternating voltage source and a control winding coupled to the third winding of said first fixed transformer, and a third variable ratio transformer having an input circuit coupled to said alternating voltage source, an output circuit coupled to the fifth winding of said second fixed transformer, and a mechanically movable element operatively connected to said integrating motor.

11. Apparatus according to claim 10 including a third fixed ratio transformer coupling the third winding of said first fixed transformer to the control winding of said integrating motor, and a non-linear impedance disposed in series with the third winding of said first fixed transformer.

12. Apparatus according to claim 10 including a third fixed ratio transformer coupling the third winding of said first fixed transformer to the control winding of said integrating motor, and an incandescent lamp disposed in series with the third winding of said first fixed transformer.

13. Apparatus according to claim 10 including an incandescent lamp and transformer means to couple said lamp in circuit with the control winding of said servo motor.

References Cited in the file of this patent
UNITED STATES PATENTS

| | | |
|---|---|---|
| 559,904 | Pfatischer | May 12, 1896 |
| 2,452,784 | Noodleman | Nov. 2, 1948 |